United States Patent [19]

Saneto et al.

[11] Patent Number: 4,732,194

[45] Date of Patent: Mar. 22, 1988

[54] ASYMMETRIC TIRE AND TREAD

[75] Inventors: Kazuyoshi Saneto, Hadano; Mitsutoshi Saeki, Hiratsuka, both of Japan

[73] Assignee: The Yokohama Rubber Co., Ltd., Tokyo, Japan

[21] Appl. No.: 848,879

[22] Filed: Apr. 7, 1986

[51] Int. Cl.⁴ .............................................. B60C 11/04
[52] U.S. Cl. .......................... 152/209 R; 152/209 A; 152/209 B; 152/455; 152/526
[58] Field of Search .......... 152/209 R, 209 D, 209 B, 152/136, 455, 209 A, 526; D12/140, 141

[56] References Cited

U.S. PATENT DOCUMENTS

Re. 26,713  11/1969  Mirtain et al. .................. 152/455
3,896,869   7/1975   Fujishima et al. ............... 152/534

FOREIGN PATENT DOCUMENTS 2707504  8/1978  Fed. Rep. of Germany ... 152/209 D

Primary Examiner—Michael Ball
Attorney, Agent, or Firm—Armstrong, Nikaido Marmelstein & Kubovcik

[57] ABSTRACT

A cord inclination angle of the outermost belt layer of a tire on the right side with respect to a tire running direction is arranged in such a manner as to be inclined leftwardly downward in the tire running direction while the cord inclination angle of the outermost belt layer of the left tire is arranged in such a manner as to be inclined rightwardly downward in the tire running direction. In addition, projecting bent portions of lug grooves on a tread pattern of a tire grounding surface are disposed outside from the center of a tread exploded width in the tire running direction.

3 Claims, 21 Drawing Figures

ASYMMETRIC TIRE AND TREAD

BACKGROUND OF THE INVENTION

This invention relates to a pneumatic tire having improved performance on a wet road.

When a car runs on a wet road, a coefficient of friction between tires and the wet road surface drops generally. Particularly when the water depth of the wet road surface is great or when a running speed of the car is high, a water layer develops between the tires and the road surface and the coefficient friction drops drastically. Such a state is generally referred to as "hydroplaning".

If hydroplaning occurs, the car cannot be driven any more than an accident will occur. This hydroplaning is likely to occur in the case of flat tires at a high running speed.

Therefore, various attempts have been made to this data to prevent the occurrence of hydroplaning, but none of them are yet entirely satisfactory.

SUMMARY OF THE INVENTION

The present invention contemplates to provide a pneumatic tire which can exhibit excellent driving performance even when a car runs on a wet road surface.

In right and left tires that are fitted to a car on the same axis, pneumatic tires of the present invention are characterized in that:

(1) a cord inclination direction of the outermost belt layer of the tire on the right side with respect to a tire running direction is arranged in such a manner as to be inclined leftwardly downward with respct to the tire running direction as viewed outwardly (or facing the tread of the tire), while the cord inclination direction of the outermost belt layer of the tire on the left side in the tire running direction is arranged in such a manner as to be inclined rightwardly downward with respect to the tire running direction as viewed outwardly (or facing the tread of the tire) and in that (2) a tread pattern consisting of a plurality of ring-like main grooves in a tire circumferential direction and lug grooves connecting the main grooves to one another is formed on a tire grounding surface, the lug grooves are bent in such a manner as to project in a tire rotating direction, and the bent portions are disposed outside from the center of a tread exploded width in the tire running direction.

The above and other objects and features of the present invention will become more apparent from the following description to be taken in conjunction with the accompanying drawings.

DESCRIPTION OF THE PREFERRED EMBODIMENTS

Figure 1:
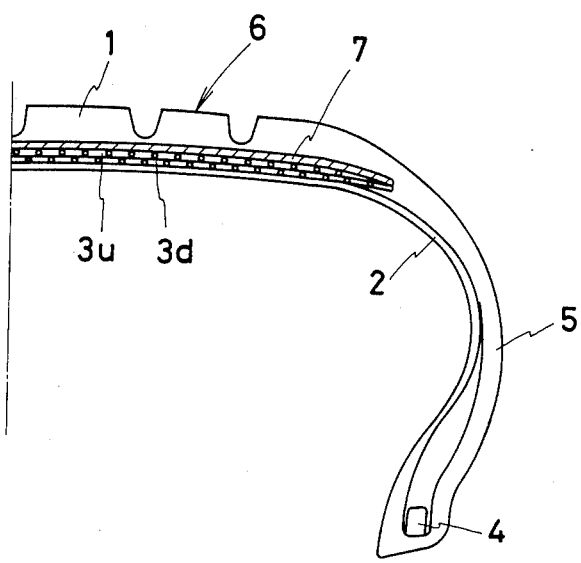
FIG. 1 is a semi-sectional schematic view in a meridian direction of an example of pneumatic tires.

Pneumatic tires are generally constituted as shown in FIG. 1 of the accompanying drawings. In FIG. 1, the reference numeral 1 represents a tread and reference numeral 2 designates a carcass layer fitted between a pair of right and left bead wires. An upper belt layer $3u$ and a lower belt layer $3d$ are disposed at the tread 1 in such a manner as to encompass the outer periphery of the carcass layer 2. Reference numeral 5 represents a pair of right and left side walls continuing the right and left bead wires 4, 4, respectively. Reference numeral 6 represents a crown consisting of the tread 1 and numeral 7 designates belt cover layer.

In tires for high speed driving, a belt cover layer consisting of a nylon material or the like having by far lower rigidity than the belt layer $3u$, $3d$ described above is disposed on the belt layer in a tire circumferential direction in order to improve high speed durability, but since this belt cover layer does not directly affect the performance to which the present invention pertains, the description on the belt cover layer will be herein omitted.

Figure 2:
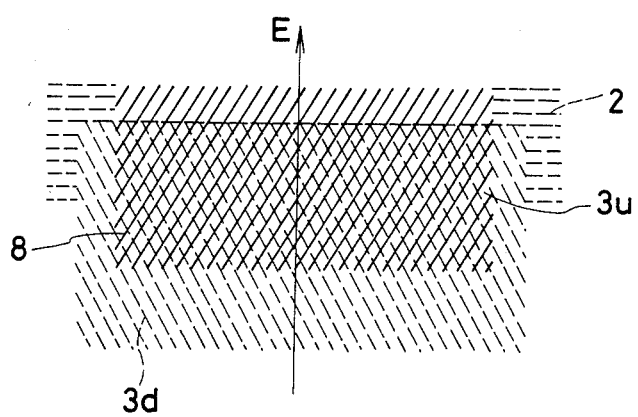
FIG. 2 is a schematic plan view of a right-hand tire in the right and left pneumatic tires that are fitted to a car on the same axis, with respect to a tire running direction.
Figure 3:
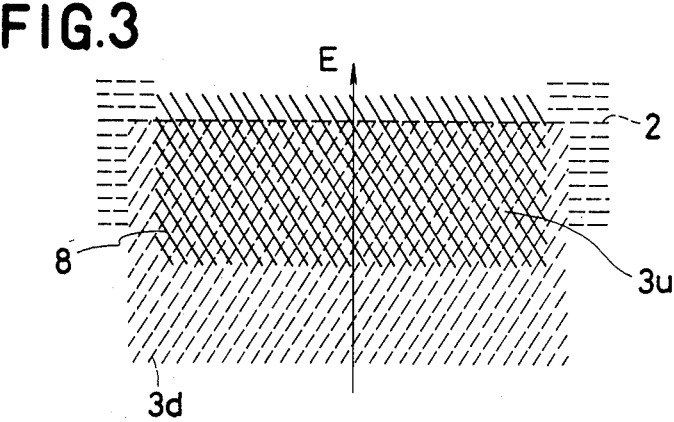
FIG. 3 is a schematic plan view of a left-hand tire in the right and left pneumatic tires that are fitted to a car on the same axis, with respect to the tire running direction.

(1) In the pneumatic tire of the type described above, the present invention arranges a cord inclination angle of the upper belt layer (upper belt layer $3u$) as depicted in FIGS. 2 and 3 for the right and left tires in a forward running direction when the tires are fitted to a car.

FIG. 2 is a schematic plan view of the right tire in the forward running direction among the right and left pneumatic tires that are fitted to the car and are coaxial with each other. FIG. 3 is a schematic plan view of the left tire in the forward running direction of the right and left tires described above. In these drawings, an arrow E represent the forward rotating direction of the tires.

As to the right tire in the forward running direction, the inclination direction of the cords 8 of the upper belt layer $3u$ is arranged to be inclined leftwardly rearwardly with respect to the forward rotating direction E as viewed outwardly (or facing the tread of the tire) (hereinafter referred to as an "L structure") as shown in FIG. 2. On the other hand, the inclination direction of the cords 8 of the outermost belt layer $3u$ in the left tire in the forward running direction is arranged to be inclined rightwardly and rearward with respect to the rotating direction E as viewed outwardly (or facing the tread of the tire) (hereinafter referred to as an "R structure") as shown in FIG. 3.

Since the cord inclination directions of the belt layers are stipulated as described above, it is possible to provide a car with well-balanced driving performance at a small handle steering angle.

Figure 4:
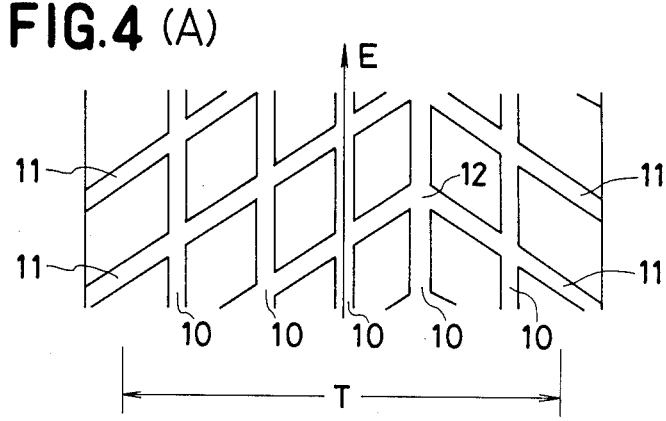
FIG. 4(A) is a schematic view showing a tread of the right-hand tire in the tire running direction.
FIG. 4(B) is a schematic view showing a tread of the left-hand tire in the tire running direction.
Figure 4:
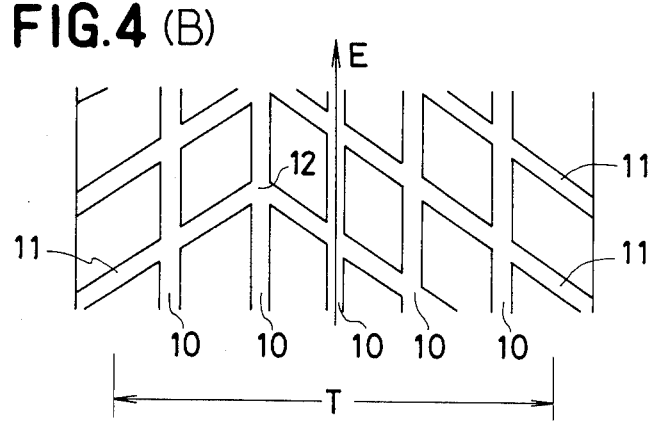

(2) In the present invention, further, tread patterns such as shown in FIGS. 4(A) and 4(B) are formed on the grounding sufaces of the tires.

FIG. 4(A) shows the tread pattern of the right tire in the forward running direction while FIG. 4(B) shows the tread pattern of the left tire in the forward running direction.

Each of these tread patterns consists of a plurality of parallel main grooves 10 that are ring-like in the tire circumferential direction and parallel angled lug grooves 11 that connect the main grooves 10. Lug grooves 11 are angled to project rearwardly in the tire rotating direction from the opposite sides of a main groove 12, and are positioned outward from the center of the width T of the tread of the forward running direction.

Figure 5:
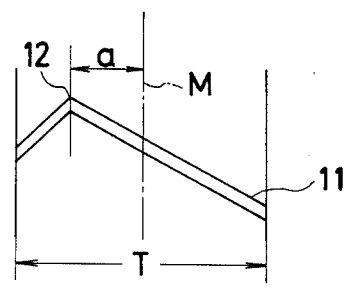
FIG. 5 is a schematic showing the distance of a bent portion of a lug groove from the center of a tread exploded width.

The distance of main groove 12 from the center of the width T of the tread is represented by symbol a in FIG. 5. In the drawing, symbol M represents the center line of the exploded width T of the tread.

Figure 6:
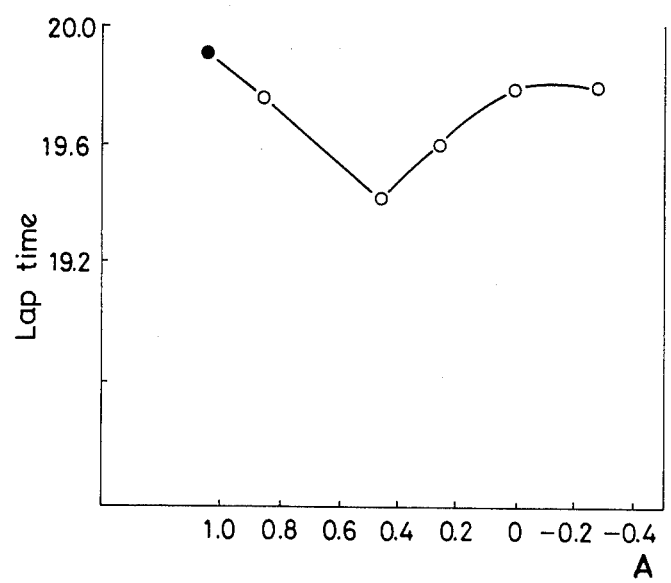
FIG. 6 is a diagram showing the relation between a lap time and A=a/(tread exploded with T/2)

As to this distance a, the relation between $A = a/(\text{tread width } T/2)$. A turning lap time of a wet circle is examined with the result shown in FIG. 6. In FIG. 6, a positive value represents that the bending point is positioned outside the center while a minus value represents that the bending point is positioned inside the center. The ordinate represents the lap time while the abscissa designates the A value. (incidentally, 0 on the abscissa represents the center position of the tread width T). In FIG. 6, black circle represents portions beyond the bent portion. It can be understood from this diagram that the A value is preferably in the range of from 0.2 to 0.8.

Figure 7:
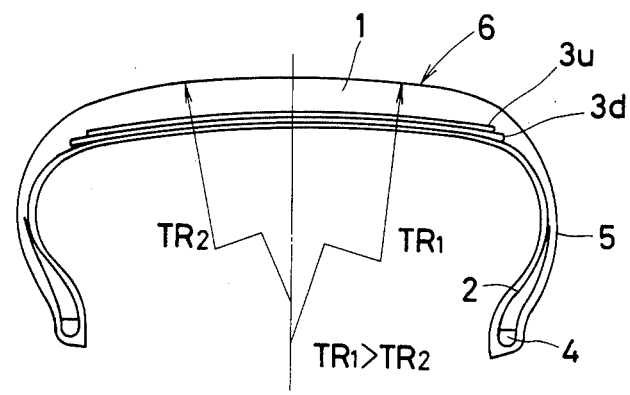
FIG. 7(A) is a schematic view showing a right-hand tire having an asymmetric profile structure in the tire running direction.
FIG. 7(B) is a schematic view showing a left-hand tire having an asymmetric profile structure in the tire running direction.
Figure 7:
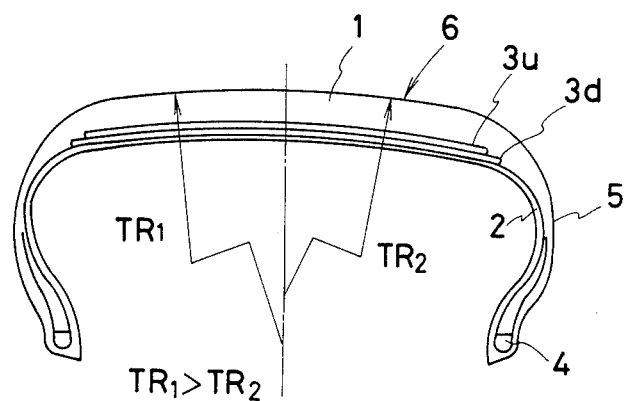

(3) The pneumatic tire of the present invention comprising the constituent requirements (1) and (2) described above may be not only a symmetric profile structure in which the tread radius of the tire is the same on the right and left with respect to the equator plane of the tire, but also an asymmetric profile structure in which the tread radius of the tire is different on the right and left with respect to the equator plane of the tire, as shown in FIGS. 7(A) and 7(B), respectively.

FIG. 7(A) shows the tire of the asymmetric profile structure on the right side in the running direction, and FIG. 7(B) shows the tire of the asymmetric profile structure on the left side in the running direction. In these drawings, the tread radius $TR_1$ is greater than $TR_2$, and the tire is fitted so that its portion on the $TR_1$ side faces outwards of the car.

Next, the reasons why the requirements (1) and (2) are stipulated in the present invention will be explained in detail about the case of the pneumatic tires of the L structure and R structure, each having the symmetric profile structure.

Figure 8:
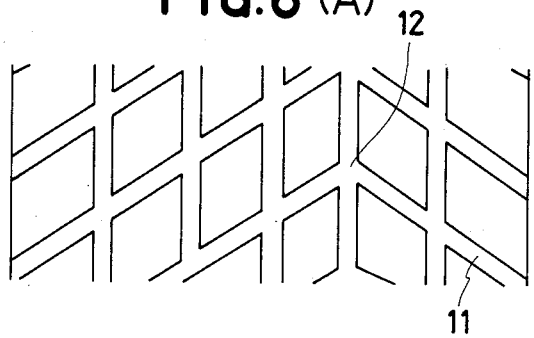
FIGS. 8(A), 8(B), 9(A), 9(B), 10(A) and 10(B) are schematic views showing various tread patterns.
Figure 8:
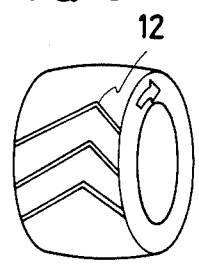
Figure 9:
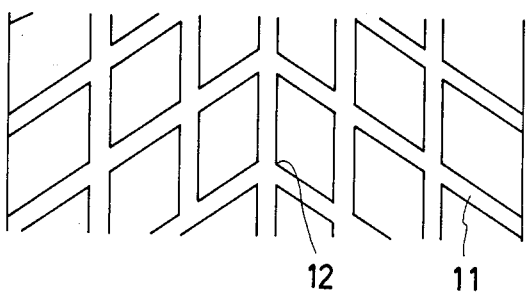
Figure 9:
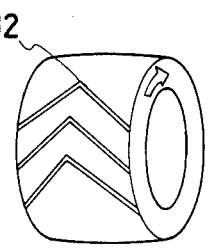
Figure 10:
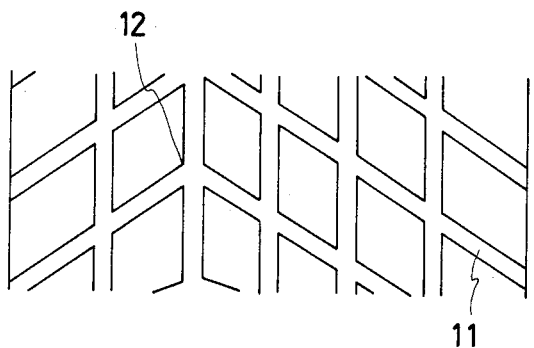
Figure 10:
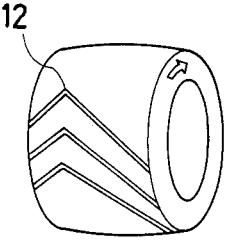

FIGS. 8, 9 and 10 show various tread patterns. FIGS. 8(A) and 8(B) show the cases where the main groove 12 from which lug grooves 11 angularly project are positioned rightward from the center of the tread exploded width T in the tire rotating direction (in the direction represented by arrow), and FIGS. 9(A) and 9(B) show the cases where the main groove 12 from which lug grooves 11 angularly project are positioned at the center of the tread exploded width T. FIGS. 10(A) and 10(B) show the cases where the main groove 12 from which lug grooves 11 angularly project are positioned leftward from the center of the tread exploded width in the tire rotating direction (in the direction represented by arrow).

Figure 11:
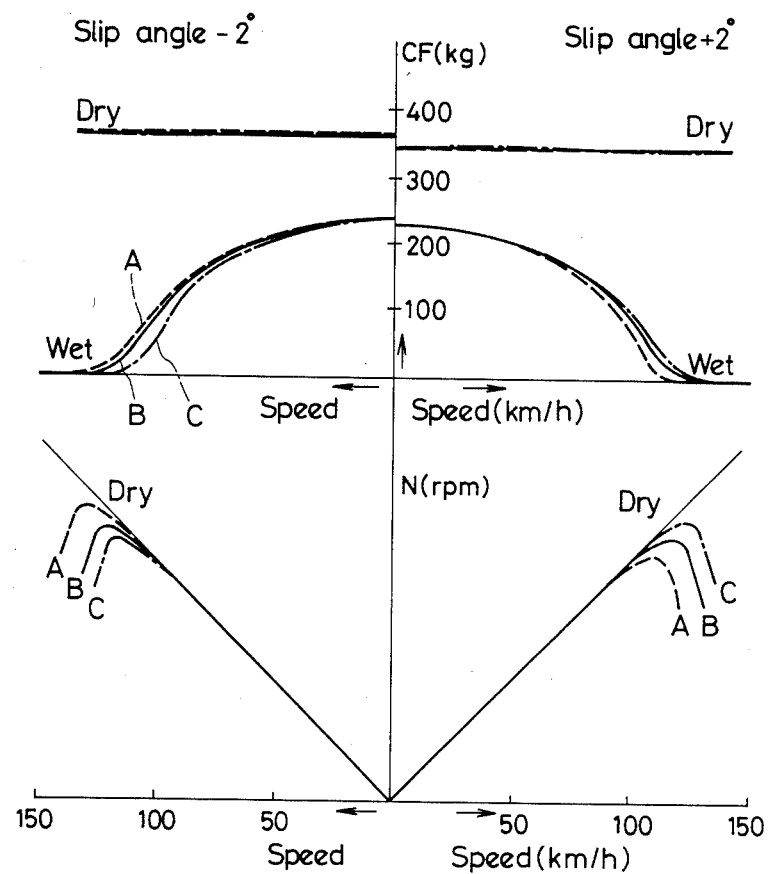
FIGS. 11(A) and 11(B) are diagrams showing the relation between a speed (km/hr) and a number of revolution (N rpm) of a tire and between the speed and concerning force (CF: kg)
Figure 11:
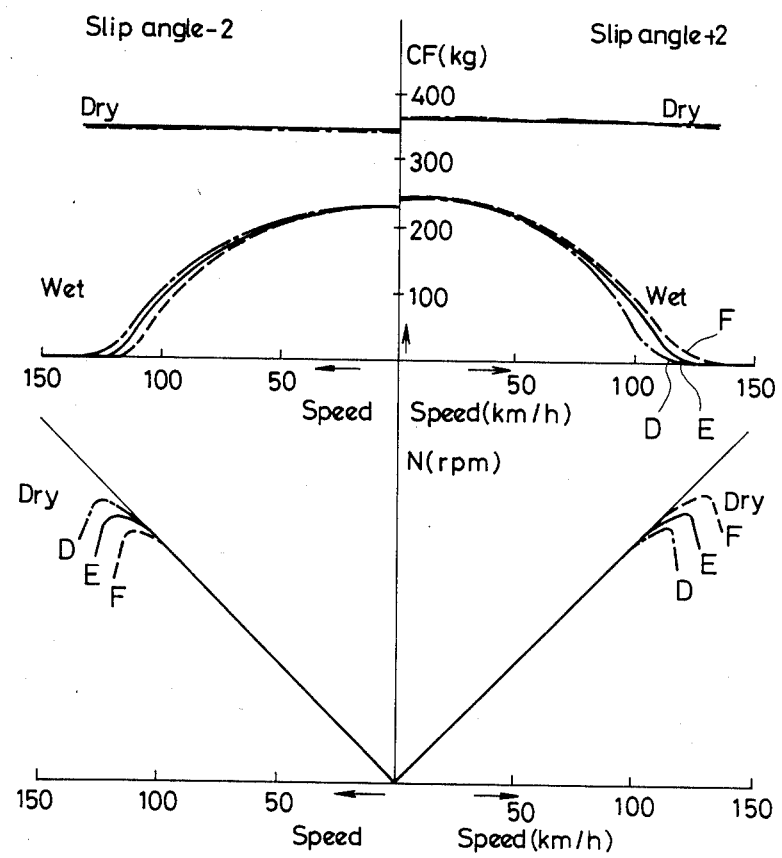

The cornering force and number of revolution (N rpm) of the tires having the tread patterns of these three kinds of designs on a wet road surface (water depth: 4mm) and a dry road surface (drum surface) were measured indoors with the result shown in FIGS. 11(A) and 11(B).

(a) Each of tires A, B and C has the L structure, and
 (1) the tire A has the pattern of FIGS. 8(A) and 8(B);
 (2) the tire B has the pattern of FIGS. 9(A) and 9(B); and
 (3) the tire C has the pattern of FIGS. 10(A) and 10(B).

(b) Each of tires D, E and F has the R structure, and
 (1) the tire D has the pattern of FIGS. 8(A) and 8(B);
 (2) the tire E has the pattern of FIGS. 9(a) and 9(B); and
 (3) the tire F has the pattern of FIGS. 10(A) and 10(B).

In FIGS. 11(A) and 11(B), the ordinate represents the speed (km/hr) and the abscissa does the number of revolution (N rpm) of the tire and the cornering force (CF: kg). FIG. 11(A) represents the tires of the L structure and FIG. 11(B), the tires of the R structure.

As can be seen clearly from FIG. 11(A), in the case of the tires of the L structure and a minus slip angle (left turning), the drop of the cornering force on the wet road surface was low, the drop of the number of revolution of the tire was low, too, and the friction between the road surface and the tire grounding surface was great in the case of the tire (tire A) in which the main groove 12 from which lug grooves 11 angularly project were on the right side (on the serial side) in the tire rotating direction. The cornering force on the dry road surface was also great in this case. In the case of the tires of the R structure and a plus slip angle (right turning), the drop of the cornering force was low on the wet road surface, the drop of the number of revolution of the tire was low, too, and the friction between the road surface and the tire grounding surface was great in the case of the tire (tire F) in which the main groove 12 from which lug grooves 11 angularly project were on the left side in the tire rotating direction, as shown in FIG. 11(B). The cornering force on the dry road surface was also great in this case.

Incidentally, the term "plus" in FIG. 11(A) represents when the tire serial side is on the right side and the slip angle of the tire develops on the right side, and it represents in FIG. 11(B) when the tire serial side is on the left side and the tire slip angle develops on the right side.

When a car turns the corner, a load moves generally to the outer tire on the same axial of the car body as viewed from the center of the radius of turning of the car, and the load to the outer tire becomes greater than when the car runs straight, while the load to the inner tire becomes smaller. For this reason, higher cornering force (frictional force) can be obtained even when running on the wet road surface, by fitting the tire A on the right side and the tire F on the left. This is because CF of the plus slip angle of the tire on the left contributes greatly at the time of right turn and CF of the minus slip angle of the tire on the left contributes greatly at the time of left turn.

It can be thus understood that in the case where the tire of the L structure is used as the right tire and the tire of the R structure is used as the left tire, the lug grooves that project to the tire rotating direction may be designed in such a manner that their main grooves are positioned outward.

The following is an experimental example of the present invention.

EXPERIMENTAL EXAMPLE

Figure 12:
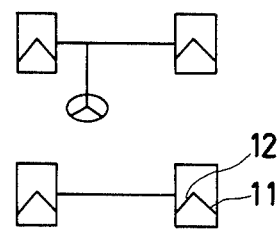
FIGS. 12(A), 12(B) and 12(C) are schematic views of tires fitted to a car.
Figure 12:
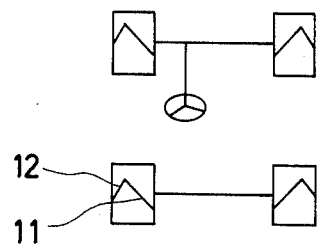
Figure 12:
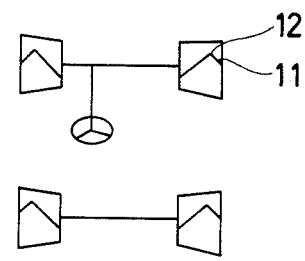

An actual running test of a car was carried out using several tire arrangements shown in FIG. 12 and also listed below.

Tire arrangement $S_1$
  [Comparative Example shown in FIG. 12(A)]
  tire strucure: symmetric profile
  main groove portion: center of tread exploded width
  right-hand tire: L structure
  left-hand tire: R structure Tire arrangement $S_2$
  [Example of this invention shown in FIG. 12(B)]
  tire structure: symmetric profile
  main groove portion: outside
  right-hand tire: L structure
  left-hand tire: R structure Tire arrangement $S_3$
  [Example of this invention shown in FIG. 12(C)]
  tire structure: asymmetric profile
  main groove portion: outside
  right-hand tire: L structure
  left-hand tire: R structure The test car used for the test was "Alpina B 7S Turbo" and the tire size was 225/50 VR 16. The actual car running test was carried out by measuring the running speed and acceleration in the transverse direction while the test car was turning round a predetermined circumference of a circle (partially including a wet road surface of 4 mm depth). The result was shown in FIG. 13. In this diagram, circle ○ represents the tire arrangement $S_1$, X represents the tire arrangement $S_2$ and triangle Δ represents the tire arrangement $S_3$. The ordinate represents the acceleration (G) in the transverse direction and the abscissa represents the running speed (km/hr).

Figure 13:
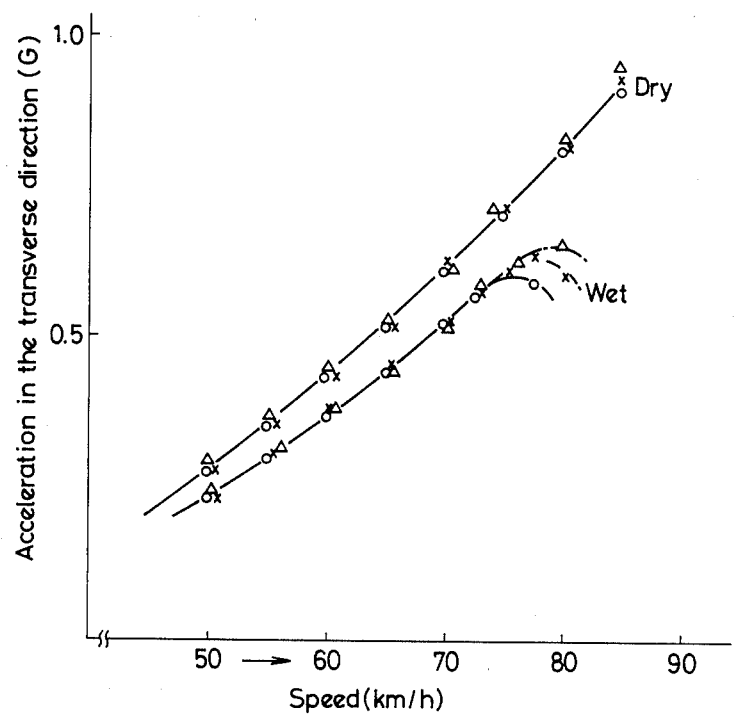
FIG. 13 is a diagram showing the relation between a running speed and acceleration in a transverse direction of a test car.

It can be understood from FIG. 13 that the drop of acceleration in the transverse direction is smaller up to a high speed and the limit speed for the occurrence of hydroplaning is higher in the case of the tire arrangement $S_2$ having the main groove portion at the external portion of the tire than in the tire arrangement $S_1$ having the main groove portion at the center of the tire as the design of the tread pattern. It can also be understood that the drop of acceleration in the transverse direction is smaller in the tire arrangement $S_3$ of the asymmetric profile than in the tire arrangement $S_2$. Therefore, the tire arrangement $S_3$ exhibited the highest speed limit of the occurrence of hydroplaning and the car can be driven safely even at a high driving speed in this case.

As described above, the present invention employs the L structure and the R structure for the belt layers of the tire and disposes the main groove portions of the lug grooves in the tread pattern on the tire grounding surface at the external portions from the center of the tread exploded width with respect to the tire running direction. Therefore, the present invention can sufficiently improve the running performance on a wet road surface.

What is claimed is:

1. In right and let pneumatic tires that are fitted to a car on the opposite end of the same axis, characterized in that:
   (1) a cord inclination direction of the upper belt layer of the tire on the right side with respect to a tire forward running direction is arranged in such a manner as to be inclined leftwardly and rearwardly with respect to the tire forward running direction and a cord inclination direction of the upper belt layer of the tire on the left side with respect to the tire forward running direction is arranged in such a manner as to be inclined rightwardly and rearwardly with respect to the tire forward running direction; and
   (2) a tread pattern consisting of a plurality of parallel ring-like main grooves in a tire circumferential direction and parallel angled lug grooves connecting said main grooves to one another on a tire grounding surface, said lug grooves being angled to project rearwardly with respect to the tire forward rotating direction from the opposite sides of a main groove disposed outside of the center of the tread width in the tire running direction.

2. Pneumatic tires according to claim 1, wherein said tires have a symmetric profile structure in which the tread radius of the tire is the same on the right and left sides of the tread center line.

3. Pneumatic tires according to claim 1, wherein said tires have an asymmetric profile structure in which the tread radius in different on the right and the left sides of the tread center line.

* * * * *